United States Patent Office 2,924,577
Patented Feb. 9, 1960

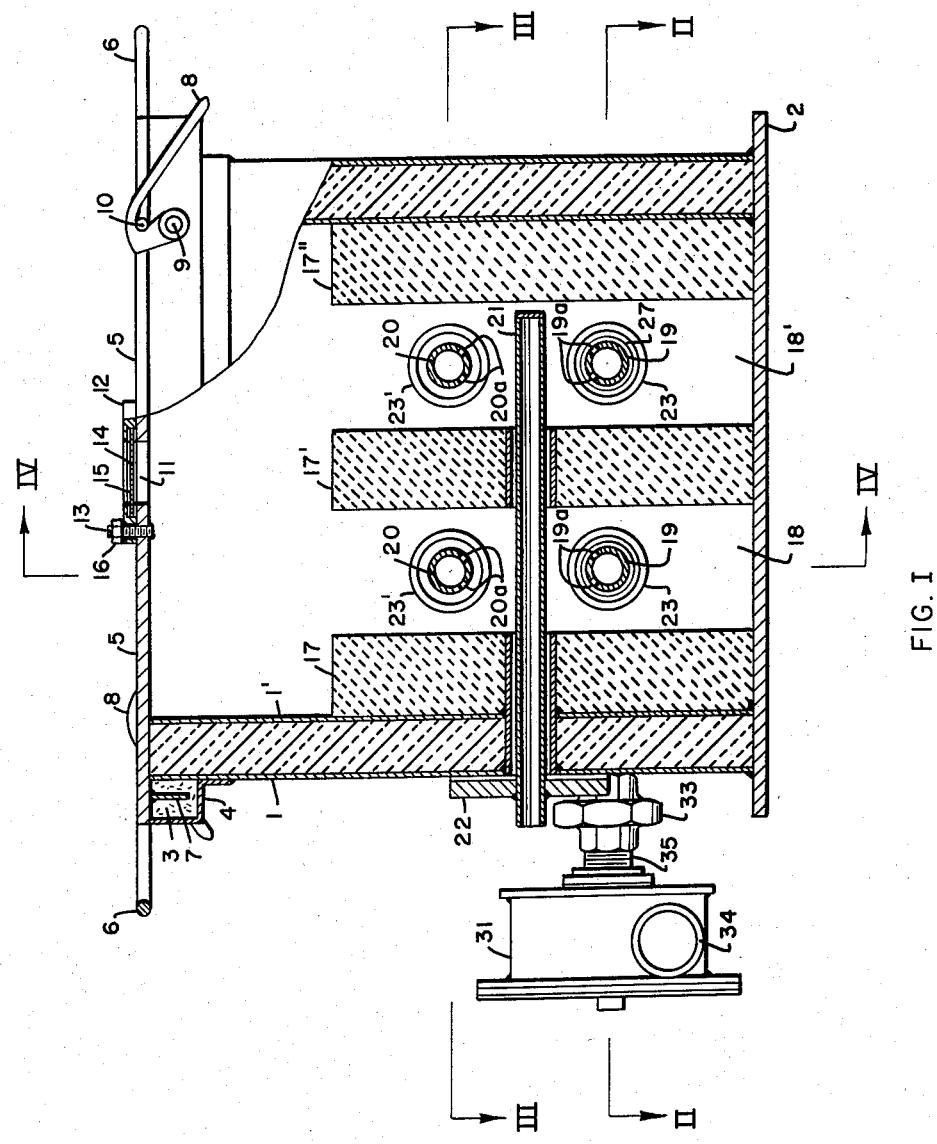
FIG. I
INVENTOR
YVES TOUSSAINT

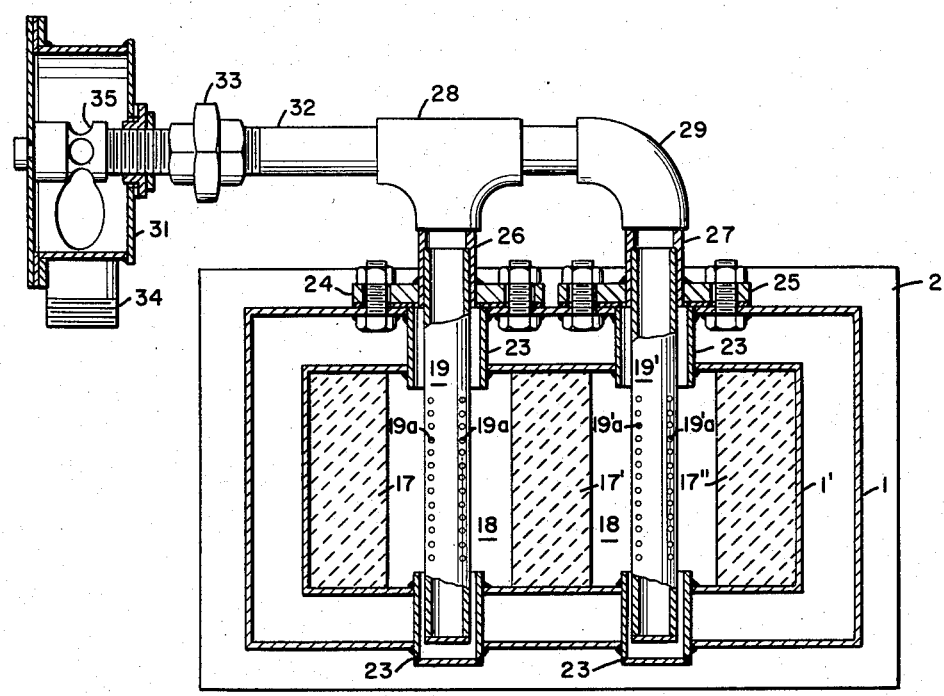
FIG. II
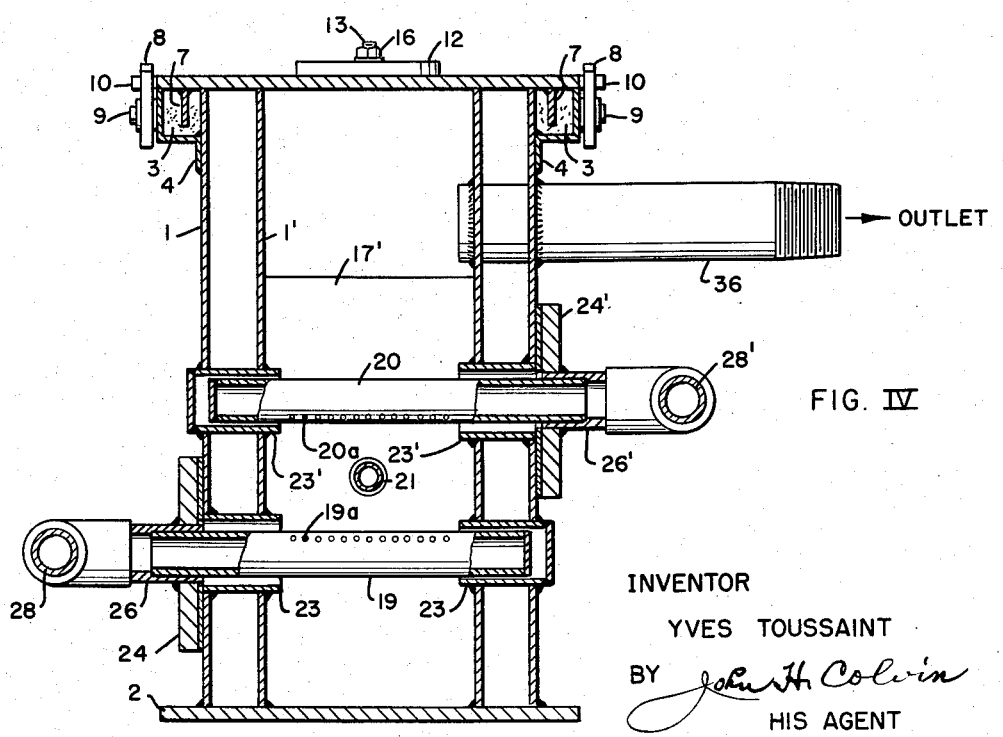
FIG. IV
INVENTOR
YVES TOUSSAINT

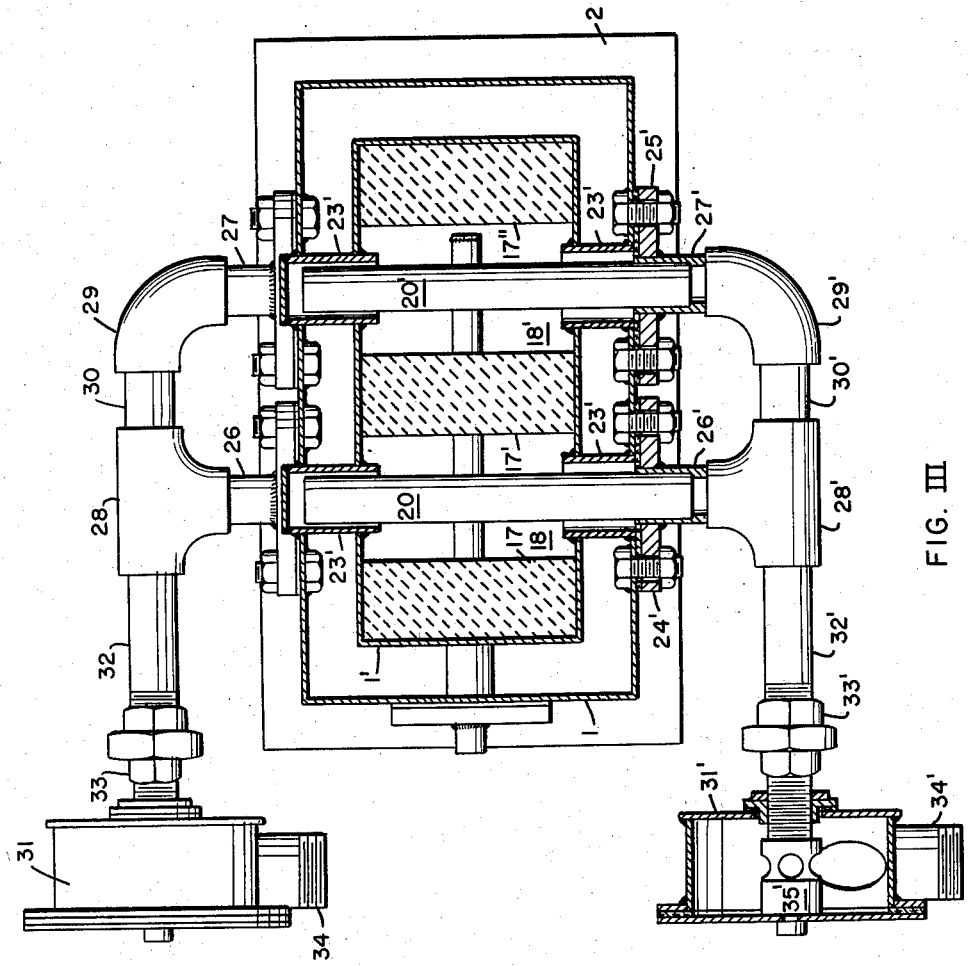

2,924,577

PRODUCTION OF CONTROLLED ATMOSPHERES AND GAS GENERATOR THEREFOR

Yves Toussaint, Paris, France, assignor to Shell Development Company, New York, N.Y., a corporation of Delaware Application June 2, 1955, Serial No. 512,825

Claims priority, application France June 5, 1954

7 Claims. (Cl. 252—373)

The invention relates to a method for producing controlled gas atmospheres and to a gas generator for carrying out this process.

Among other applications this method is particularly intended for the production of an artificial atmosphere which is formed by a mixture of gases fulfilling certain conditions, and which is to be introduced into a practically airtight furnace in which are heated objects to be treated which mixture may be either a "neutral" atmosphere which does not react on the objects treated or an "active" atmosphere bringing about one or more well-defined reactions (case hardening, decarbonization, controlled oxidation, deoxidation, etc.).

There are at present various types of apparatuses producing such atmospheres and the following generators may be mentioned in particular:

A. Cracked ammonia generators for producing neutral or deoxidizing atmospheres consisting of nitrogen and hydrogen;

B. Wood charcoal generators for producing neutral, reducing or carburizing atmospheres consisting of $CO_2$, $CO$, $H_2$, etc.;

C. Incomplete hydrocarbon combustion generators for producing neutral $CO_2$ and $CO$ atmospheres;

D. Combustion and catalytic reaction generator, wherein a fuel gas is burned in indirect heat exchange with an active catalyst mass and the combustion product is partially dried and then catalytically reacted with a hydrocarbon over the heated catalyst. The external heating of the catalyst is inefficient, lower temperatures required to avoid active catalyst degradation are thermodynamically unfavorable for providing reducing atmospheres, and other shortcomings militate against this method.

E. Hydrocarbon cracking and controlled oxidation generator for producing $CO_2$, $CO$, $H_2$, $CH_4$, which atmospheres are neutral or active according to the manner in which the plant is regulated.

In apparatus of the latter type the heat required to maintain the reaction temperature may be supplied according to circumstances either by external or internal heating.

Apparatus with external heating have, however, a considerably reduced efficiency, and the internal heating apparatus hitherto used only have a narrow control range.

Cracking is, in fact, carried out under very special conditions.

The gaseous hydrocarbon, mixed with a certain proportion of air and, if desired, with steam, is passed through a contact mass (catalyst) usually consisting of alumina particles and raised to a high temperature ranging from 950° to 1150° C. The hydrocarbon molecules are thus cracked, the oxygen in the air combining with the carbon to form carbon dioxide or carbon monoxide, while the hydrogen remains in the free state or combines to form water.

Under certain conditions the temperature of the contact mass can be maintained by the release of heat caused by the reaction itself.

For this purpose, however, it is necessary that the proportion of oxygen should be sufficient to prevent the hot zone from advancing into the catalyst with the flow of the mixture.

Moreover, it is difficult to produce a gas rich in $CO_2$ without the risk of ignition in the supply line of the mixture.

For these reasons the possibilities of using such apparatus are considerably restricted. In fact, their use is limited to producing substitute gas in municipal gas works.

The object of the present invention is to provide a method which is without the drawbacks of the previous methods and allows widely varied controlled atmospheres to be obtained by means of gaseous mixtures of which certain proportions were hitherto inadmissible in the existing apparatus.

The method, in accordance with the present invention, consists in introducing into a particulate contact mass preferably distributed in several vertical chimneys, the basic gaseous mixture of combustible material and oxygen (air) on two different horizontal planes or stages and in proportions which may, if desired, differ from one stage to the next, so as to bring about a two-stage reaction by causing the mixture to flow from the lower to the upper level, the mixture introduced at the lower stage being relatively rich in air so as to cause a highly exothermic reaction and to maintain the contact mass at a high temperature, while providing at the same time hot reaction products, while the mixture introduced at the upper stage may have a very low air content so as to cause a weakly exothermic or even endothermic reaction, this reaction being produced between the hydrocarbon and the air introduced at this level and the reaction products of the lower level.

The overall two-stage reaction is exothermic, involving both exothermic reactions of carbon and of hydrogen with oxygen to form oxides of carbon and water, as well as endothermic cracking of the hydrocarbon combustible material.

Each stage is usually operated under conditions of partial combustion, although when they differ the first stage is usually the more highly exothermic and represents a more complete combustion operation.

The bed of particulate, refractory, contact mass serves a primary purpose of leveling out the temperature conditions, usually with transfer of heat from the more exothermic first stage to the second stage, so as to maintain the second stage reaction although the net reaction therein may be endothermic. It serves a secondary purpose of stabilizing the combustion or reaction zones by ensuring a combustion within the combustion zones even when the gas velocity therein is such that in the absence of the solid surfaces a combustion zone could not be maintained therein.

The feed stream (hydrocarbon and air) to the first stage zone of the contact mass is usually deficient in oxygen for complete combustion to carbon dioxide and water, although a stoichiometric amount may be used. The temperature produced in this zone can vary over a wide range, depending on the flow rate, degree of completeness of the combustion, rate of heat transfer therefrom to the outside as well as to the adjacent second zone of contact material. The temperature is maintained sufficiently high to maintain the partial combustion thereing and to maintain essentially steady state conditions in this zone.

The feed stream to the second stage, additional to the product stream passing directly thereto from the first stage, may be such as to provide for a net exothermic or endothermic reaction therein. When producing a highly reducing atmosphere, it is usually such as to provide a substantial proportion of endothermic cracking of hydrocarbons with the production of a substantial proportion of free hydrogen.

As it is first necessary to raise the contact mass to a temperature sufficient to make the indicated reactions possible, this preliminary heating is effected by introducing at the lower level a mixture rich in air (stoichiometric proportions or with excess air) which is lit on the surface of the contact mass. When the reaction temperature is reached at the bottom of the upper admission stage the relative discharges and proportions of air and gas of the mixtures introduced at both levels are regulated and the normal process can proceed according to the method described above.

The invention also includes a generator for effecting the said process, characterized in that it comprises a heat-insulated vessel with a double wall, in the interior of which are arranged, by means of fire bricks, one or more vertical chimneys which receive the contact mass, and in the interior of each are arranged, on two different levels, perforated pipes which pass through the contact mass and allow the basic gaseous mixture to enter it at two different stages and in proportions which may differ from one stage to the other. The generator and the chimneys therein may be of various cross-sectional shapes, such as rectangular or circular.

The pipes through which the gaseous mixture is admitted into the contact mass are made of materials which resist high temperatures and are readily perforated with holes in rows at an angle of about 90°. The holes in the pipes on the lower stage are turned upwards and the holes in the pipes on the upper stage are turned downwards. The pipes and the openings therein are adapted to provide uniform gas distribution across the sections of the chimneys.

A tube arranged between the two stages of pipes and passing through all the chimneys and the double wall on one of the side walls of the apparatus allows a device for measuring temperatures to be inserted in the contact mass and reading the temperature prevailing in each chimney.

The vessel is closed by a cover, sealed, for example by sand, with an opening in the center closed by a pivoting disc provided with a window permitting of effecting ignition in order to start the reaction and observation of the latter while the generator is in operation.

The pipes on one of the stages are fed with the gaseous mixture on one side of the apparatus and the pipes on the other stage on the opposite side.

Suitable storage and pumping or compression means are provided to supply the hydrocarbon and the air at suitable pressures required to maintain the desired flow rates.

An embodiment of the generator is described in detail below, merely as an example, with reference to the accompanying drawing wherein like numerals in the different figures refer to the same elements and in which:

Fig. I is a longitudinal sectional elevation of the generator;

Fig. II is a horizontal section taken on the line II—II of Fig. I;

Fig. III is a horizontal section taken on the line III—III of Fig. I;

Fig. IV is a vertical cross section along the line IV—IV of Fig. I.

The generator according to the invention comprises a parallelepipedal vessel formed by means of two metal walls 1 and 1' welded to a rectangular base plate 2 between which walls a heat-insulating material is provided.

A channel 3 is arranged on the upper part of the wall 1 and on its periphery by means of a Z-shaped section 4 welded to the said wall.

The vessel may be closed by a cover 5 provided with two handles 6 and the strip 7 protruding into the channel 3. As the latter is filled with sand, a gas-tight joint is thus obtained. The cover 5 is fixed to the vessel by means of four lever locks 8 hinged on a shaft 9 which is integral with the section 4 and fitting over four bolts 10 attached to the sides of the cover.

In the center of the cover is an opening 11 closed by a circular disc 12 pivoting round a pin 13 formed integral with the cover 5. The disc 12 is itself provided with an opening closed by a mica plate 14 held in the disc by means of an elastic ring 15. Pin 13 is threaded and a screw nut 16 enables the disc 12 to be kept over the opening 11 at the required pressure.

Inside the vessel are fitted three firebrick walls 17, 17' and 17", forming between them two chimneys 18 and 18', which are, for example, a little more than two-thirds of the height of the vessel.

The two chimneys 18 and 18' are traversed by pipes 19, 19', 20 and 20' arranged on two parallel horizontal planes.

These pipes, preferably of stainless steel, are perforated radially by two rows of holes 19a, 19'a, 20a and 20'a the rows of each pipe being provided at 90° from each other.

The holes in the pipes 19 and 19' on the lower plane or stage are turned upwards, while the holes in the pipes 20 and 20' of the upper plane or stage are turned downwards.

Along the longitudinal axis of the vessel and between the two stages of pipes is arranged a tubular jacket 21 closed at one end and traversing the two firebrick walls 17 and 17' and the walls 1 and 1', and leading to the exterior of the vessel fixed by a flange 22 screwed to the wall 1 by means of an asbestos packing gasket.

This jacket 21 is open at the end which is outside the vessel and allows a thermocouple to be inserted inside the chimneys.

The pipes 19 and 19' pass through the walls 1 and 1' of the vessel inside casings 23 welded to the two walls.

The said pipes are closed at the end facing the front wall of the vessel as are also the casings 23 at the outside of the wall.

On the back wall of the vessel the pipes 19 and 19' are fitted tightly in the flanges 24 and 25, provided with sockets 26 and 27 onto which are screwed a T-union 28 and an elbow 29, respectively, which enable the pipes to be joined together by a tube 30 and to an admission box 31 by means of another pipe 32 and a connection 33. The inlet box 31 is provided with a tangential nozzle 34 and a central pipe 35 which is perforated by holes and is in communication with the gas inlet pipe formed by pipes 32 and 30.

The pipes 20 and 20' (Fig. III) are arranged similarly to pipes 19 and 19' but in a reverse position, i.e. the ends facing the back wall of the vessel are closed, as are also the two casings 23' into which the pipes are fitted at the back wall of the vessel.

On the front wall of the vessel the pipes 20 and 20' fit tightly into the sockets 26' and 27' which are formed integral with flanges 24' and 25'. A T-union 28' and an elbow 29', which are connected by tube 30', are screwed onto sockets 26' and 27', respectively.

The connection 28' is joined by a pipe 32' and a connection 33' to an admission box 31' which is provided with a tangential nozzle 34' and a central inlet pipe 35'.

The walls 1 and 1' of the front wall of the vessel are traversed by a pipe 36 (Fig. IV) which is open at both ends and enables the gaseous atmosphere obtained in the generator to be collected and conducted into a furnace or any other operating device.

The contact mass is arranged in the vertical chimneys 18 and 18'. It is a particulate, highly refractory, material, such as alumina, magnesia and the like, in uniform or in irregular shapes, such as pellets, and the like.

The apparatus operates as follows:

The gaseous mixture chosen is introduced into the two stages of pipes 19, 19', 20 and 20' and flows circuitously from the lower to the upper level.

In the lower part, corresponding to pipes 19 and 19', is introduced a mixture relatively rich in air which causes a highly exothermic reaction and raises the contact mass to a high temperature, at the same time hot reaction products being provided.

The said mixture is introduced via the nozzle 34 and the admission box 31 in which it rotates on account of the tangential position of the nozzle 34. The mixture passes via the inlet pipe 32—30 and reaches the pipes 19 and 19' from which it escapes through the holes 19a.

On the upper stage formed by pipes 20 and 20' is introduced a mixture which may have a very low air content and causes a weakly exothermic reaction, this reaction being produced between the hydrocarbon and the air introduced at this level and the reaction products of the lower level.

This mixture is introduced via the nozzle 34' of the admission box 31' and reaches the pipes 20 and 20' via the inlet pipe 32'—30' from which it escapes into the chimneys 18 and 18' via the holes 20a and 20'a.

Before starting to create atmospheres it is necessary to raise the contact mass to a sufficiently high temperature. This preliminary heating is effected by introducing at the lower level, viz. via the nozzle 34, the box 31, the pipe 32—30 and the pipes 19 and 19', a mixture which is rich in air (stoichiometric proportion or with excess air) and lighting it on the surface of the contact mass, while the opening 11 is uncovered, the disc 12 being removed by rotating it round the pin 13.

After some moments it is observed, through the sight glass of the opening which is closed again, that the flame rises in the catalyst mass and that the combustion finally takes place without a flame in the center of the said mass.

When the reaction temperature, which is controlled by means of a thermocouple inserted into the jacket 21, is reached at the level of the latter, viz. at the bottom of the upper inlet stage, the relative discharges and proportions of air and gas of the mixtures introduced at both levels are regulated, and the reaction proceeds as stated above.

It is seen that in the normal operation of the apparatus, the reaction products of the lower level are already raised to a high temperature and that it is thus possible by means of the two-stage reaction to carry out an overall reaction which could never have been effected in a single stage, and at the same time constantly keeping the temperature of the contact mass sufficiently high for the reactions to continue to take place.

It should be noted that the regulating means on the apparatus are, on the one hand, the discharge of the mixture at each level and, on the other hand, the proportions of the mixture at each of these levels.

The following three examples show the atmospheres which it was possible to obtain by means of a generator according to the invention and used for different purposes.

1. Bright annealing of copper

Regulation:
  Mixture at lower level—
    Propane _____ liters/h__ 950
    Air _____ do____ 9,500
  Mixture at upper level—
    Propane _____ do____ 0
    Air _____ do____ 7,800

Composition of the gas: Percent
  $O_2$ _____ 0
  CO _____ 1.5–2
  $CO_2$ _____ 9–11
  $H_2$+$CH_4$ _____ 1.5
  $N_2$+$H_2O$ (before dehydration) _____ 85.5–88

II. Neutral atmosphere for hard steels

Regulation:
  Mixture at lower level—
    Propane _____ liters/h__ 1,000
    Air _____ do____ 8,500
  Mixture at upper level—
    Propane _____ do____ 1,000
    Air _____ do____ 8,500

Composition of the gas: Percent
  $O_2$ _____ 0
  CO _____ 15
  $CO_2$ _____ 5
  $H_2$ _____ 20
  $CH_4$ _____ 1
  $N_2$ _____ 59

III. Deoxidizing atomsphere

Regulation:
  Mixture at lower level—
    Propane _____ liters/h__ 282
    Air _____ do____ 1,300
  Mixture at upper level—
    Propane _____ do____ 1,300
    Air _____ do____ 3,027

Composition of the gas: Percent
  $O_2$ _____ 0
  $CO_2$ _____ 8.8
  CO _____ 13.3
  $H_2$ _____ 36
  $N_2$ _____ 41.6
  $CH_4$ _____ 0.3

The various experiments carried out with the generator described above made it possible to determine the limits of the composition of the mixtures according to the regulations as follows:

Percent
$H_2$ _____ 0–40
$O_2$ _____ 0–7
$CH_4$ _____ 0–8
CO _____ 0–20
$CO_2$ _____ 0–13
$H_2O$ _____ 0–16

I claim as my invention:

1. Method for producing controlled atmospheres in a two-stage exothermic partial combustion which comprises effecting a flameless surface combustion of a hydrocarbon while flowing upwardly as a gaseous mixture with air, rich in air and being highly exothermically reactive, through a first section of a particulate, refractory, contact mass which is non-reactive toward the gaseous mixture in a combustion and reaction zone and passing the total products of the partial combustion from the first section in admixture with a substantial proportion of a further gaseous mixture of said hydrocarbon and air upwardly into and through a second, contiguous, superimposed section of the contact mass in the combustion and reaction zone whereby a further reaction is produced between the hydrocarbon and air introduced at this stage and the combustion products of the first stage.

2. A process in accordance with claim 1, wherein said further gaseous mixture is richer in air than the gaseous mixture passed into the first section of the combustion and reaction zone.

3. A method in accordance with claim 1, wherein said further gaseous mixture has a lower air content than the gaseous mixture which is passed into the first section of the combustion and reaction zone.

4. A method for producing controlled atmospheres which comprises passing a gaseous mixture of air and hydrocarbon through a first section of a particulate, refractory contact mass maintained at a temperature sufficiently high to initiate hydrocarbon cracking and there achieving both an endothermic cracking of the hydrocarbon and an exothermic partial combustoin of the cracked material, said air being present in the mixture in an amount adequate to obtain a partial combustion liberating heat substantially in excess of the endothermic heat requirement of the cracking portion of the reaction so as to effect a transfer of heat to said particulate contact mass and to provide a gaseous stream made up of hot reaction products, and passing said hot gaseous product stream in admixture with a substantial proportion of an additional gaseous mixture of hydrocarbon and air into and through a second, contiguous, superimposed section of said contact mass to accomplish a cracking of the later-introduced hydrocarbon and a partial combustion of the cracked product produced, with the net reaction in said second section of the contact mass being endothermic and with the contact mass and said hot gaseous product stream from the first section serving to transfer heat from the more exothermic first reaction to the reaction within said second section.

5. A generator for producing controlled atmospheres in a two-stage exothermic partial combustion of a hydrocarbon in a gaseous mixture with air, comprising in combination a heat-insulated upright vessel with a double wall and top and bottom closures, a plurality of upright firebrick walls within said vessel spaced apart to provide a plurality of vertical chimneys therebetween, said firebrick walls extending from the bottom of the vessel but stopping short of the top of the vessel, thereby providing a common free space within the vessel above the plurality of chimneys, perforated pipes within each of said chimneys vertically spaced apart and adapted for the introduction thereinto of gaseous mixtures of hydrocarbon and air at two different stages so as to effect a two-stage reaction, a particulate refractory contact mass disposed inside of each vertical chimney extending at least between the perforated pipes so as to permit the transfer of heat from the proximity of one of said pipes to the proximity of the other pipe, and conduit outlet means for gases near the top of the vessel.

6. Generator according to claim 5 characterized in that each of the pipes is perforated radially by two rows of holes situated at 90° from each other.

7. Generator according to claim 5 characterized in that the holes in the pipes on the lower stage are turned upwards and the holes in the pipes on the upper stage are turned downwards.

References Cited in the file of this patent

UNITED STATES PATENTS

| | | |
|---|---|---|
| 677,670 | Krauss et al. | July 2, 1901 |
| 1,225,263 | Messerchmitt | May 8, 1917 |
| 1,518,043 | Audianne et al. | Dec. 2, 1924 |
| 1,729,581 | Hodge | Sept. 24, 1929 |
| 2,045,600 | Houdry et al. | June 30, 1936 |
| 2,330,069 | Marshall | Sept. 21, 1943 |
| 2,330,767 | Welty | Sept. 28, 1943 |
| 2,342,080 | Kalichevsky | Feb. 15, 1944 |
| 2,615,795 | Peck et al. | Oct. 28, 1952 |
| 2,646,391 | Houdry | July 21, 1953 |
| 2,844,452 | Hasche | July 22, 1958 |